Sept. 4, 1945.    C. R. BINGHAM    2,384,363
VEHICLE HITCH
Filed Oct. 5, 1944
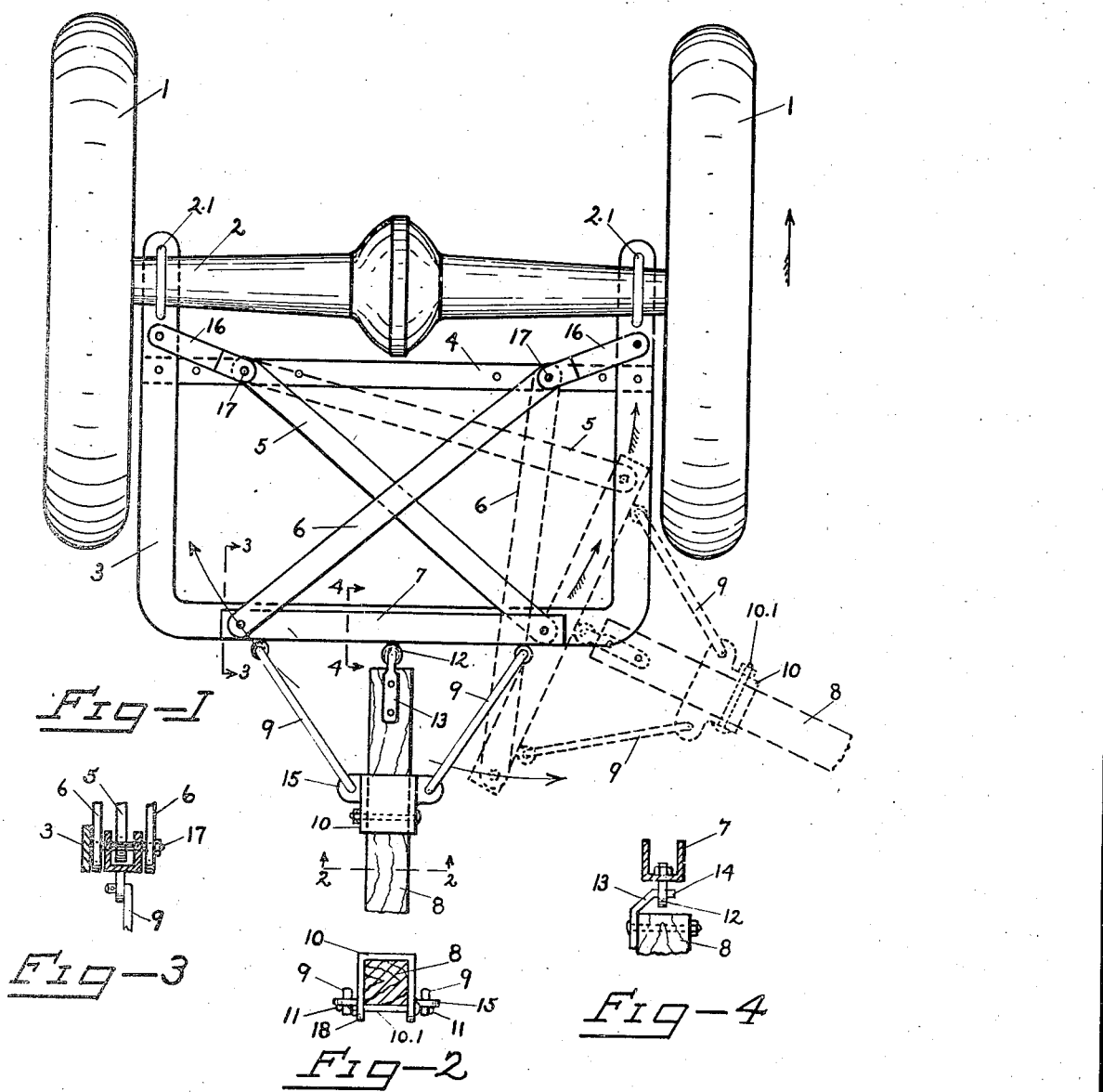

Patented Sept. 4, 1945

2,384,363

UNITED STATES PATENT OFFICE 2,384,363

VEHICLE HITCH

Charles Russell Bingham, Davenport, Iowa

Application October 5, 1944, Serial No. 557,298

7 Claims. (Cl. 280—33.44)

My invention relates to improvements in hitches for coupling on to tractors having a rear axle, trailers of various kinds used upon highways as well as agricultural and other implements and machines generally including but not limited to plows, rakes, disc harrows, cultivators, seeders, manure spreaders, and road building and grading machines drawn by tractors.

The objects of my invention are to provide an improved and simplified form of hitch which will permit turning on a short radius, will reduce side draft, and facilitate backing a trailer upon a curve. Other objects will appear from the description.

I accomplish these objects by the means illustrated in the accompanying drawing in which—

Figure 1 is a plan view of my hitch also showing in dotted lines an alternate position assumed in turning;

Figure 2 is a sectional detail on the line 2—2 of Figure 1;

Figure 3 is a sectional detail on the line 3—3 of Figure 1;

Figure 4 is a sectional detail on the line 4—4 of Figure 1;

Similar numerals refer to similar parts throughout the several views.

In the hitches heretofore in common use where the tongue of the trailer is attached to a U-bar located approximately on a line at or near the rear of the tractor rear wheels, a considerable amount of side draft is developed in turning which interferes with the movement of the tractor, and where the tongue of the trailer has its front end mounted in a fixed position in the rear of the middle of the rear axle of the tractor, it is difficult to back the tractor and trailer around a curve.

My hitch reduces side draft by having the member on which most of the pull is exerted located close to the axle and the connection of the front end of the tongue of the trailer is pivotally mounted in a movable crossbar carried by a pair of crossed diagonal draft bars which permit lateral movement of the point of attachment and facilitates backing around a curve at ordinary angles.

In the drawing, I have shown the rear wheels 1 and axle 2 of the tractor with my hitch carried by a crossbar 4 which is mounted upon a U-bar or rectangular bar 3 secured to the rear axle 2 of the tractor by U-bolts 2.1 or any desired form of fastening.

To the U-bar 3 I secure a crossbar 4 by spot welding or riveting or other suitable means.

Upon the crossbar 4, I mount upon pivot bolts 17—17 the front end of a pair of oblique bars 5 and 6 which cross each other at the middle when in normal position. The rear ends of the bars 5 and 6 are pivotally attached to a channelled draft bar 7 extending transversely of the tractor. To the middle of the draft bar 7, the tongue 8 of the trailer is attached preferably by an eye-bolt 12 which receives a hook or arm 13 united to the end of the tongue and which may be held in place by a cotter pin or key 14 or other suitable means. The eye-bolt 12 and hook 13 are so disposed as to allow free play between them whereby a flexible joint is provided which will accommodate itself to passage over uneven, rough or sloping ground.

As an additional attachment for the tongue to the draft bar, I mount a bracket 10 upon the tongue near the front end thereof, preferably formed of a broad strip or plate of metal fashioned to fit the tongue and with a part of its width forming lateral flanges 15—15 and a part 18 extending below the tongue and clamped to the tongue by the bolt 10.1. Brace rods 9—9 have their front ends pivotally united to the draft bar 7 and their rear ends pivotally secured to the flanges 15 of the bracket 10 but loosely enough to afford free play to accommodate tilting of the tractor or trailer toward either side or end.

The bars 9—9 may be secured in place in the bracket 10 by keys 11 or other suitable means. The tongue 8 may be united to front axle or body of a trailer or to the frame of a plow, harrow or other agricultural or mechanical implement in any of the usual ways.

Brace bars 16 may have one end bolted to the U-bar 3 and their other ends attached to the pivot bolts 17 to secure the oblique bars 5 and 6 firmly. The oblique bars may be single flat bars of iron but I prefer to use double or upper and lower bars 6—6 and to interpose between them the single bar 5 so proportioned that it may enter so far as necessary the channel of the draft bar 7.

When assembled as described, the oblique bars will be free to swing to or from either side as the tractor is turned and the tractive effort of the tractor will be exerted from a point relatively close to the middle of the rear axle and will thus largely do away with side draft. At the same time the draft bar will swing toward one side and draw the front end of the tongue forward and laterally simultaneously. As the oblique bars are rigid and not flexible, it is obvious that the tractor will be able to back the trailer on an ordinary curve and as there is a considerable degree of flexibility in the connections as shown, it will permit either the tractor or trailer to tilt either laterally or longitudinally when going over uneven ground. The rods 9—9 have sufficient play to permit tilting of either tractor or trailer.

Various modifications may be made in the dimensions and arrangings of the parts without departing from the spirit of my invention and I do not limit my claims to the precise form shown in the drawing.

I claim:

1. A hitch for a tractor having a rear axle and a trailer having a tongue, comprising a support united to the axle extending rearwardly, a crossbar upon the support parallel to the axle and spaced as closely thereto as the axle housing permits, a pair of rigid oblique bars crossing each other to the rear of the crossbar with their front ends pivotally attached to the crossbar and their rear ends pivotally attached to opposite ends of a transverse draft bar, and means secured to the draft bar to attach and hold the front end of the tongue of the trailer.

2. A hitch for a tractor having a rear axle and a trailer having a tongue, comprising a support united to the axle extending rearwardly, a crossbar upon the support parallel to the axle and spaced closely thereto, a pair of rigid oblique bars crossing each other to the rear of the crossbar and their rear ends pivotally attached to opposite ends of a transverse draft bar, and means secured to the draft bar to attach and hold the front end of the tongue of the trailer.

3. A hitch as described in claim 2, said means comprising an eye-bolt centrally fastened in the draft bar and a hook or arm secured upon the end of the tongue adapted to enter the eye-bolt.

4. A hitch as described in claim 2, said means comprising an eye-bolt centrally fastened in the draft bar and a hook or arm secured upon the end of the tongue adapted to enter the eye-bolt, and a cotter pin or key to prevent detachment of the arm from the eye-bolt.

5. A hitch as described in claim 2, said means comprising an eye-bolt centrally fastened in the draft bar and a hook or arm secured upon the end of the tongue adapted to enter the eye-bolt and a bracket mounted on the tongue spaced from the front end thereof, and a pair of brace rods on opposite sides of the tongue having their front ends united to the draft bar and their rear ends attached to the corresponding flanges of the bracket.

6. A hitch as described in claim 2, said means comprising an eye-bolt centrally fastened in the draft bar and a hook or arm secured upon the end of the tongue adapted to enter the eye-bolt and a bracket mounted on the tongue spaced from the front end thereof, and a pair of brace rods on opposite sides of the tongue having their front ends united to the draft bar and their rear ends attached to the corresponding flanges of the bracket the attachments of the brace rods to the tongue and draft bar being arranged to permit sufficient play therein to accommodate relative tilting of the tractor and trailer.

7. A hitch as described in claim 2, said means comprising an eye-bolt centrally fastened in the draft bar and a hook or arm secured upon the end of the tongue adapted to enter the eye-bolt and a bracket mounted on the tongue spaced from the front end thereof, and a pair of brace rods on opposite sides of the tongue having their front ends united to the draft bar and their rear ends attached to the corresponding flanges of the bracket the attachments of the brace rods to the tongue and draft bar being arranged to permit sufficient play therein to accommodate relative tilting of tractor and trailer either laterally or longitudinally.

CHARLES RUSSELL BINGHAM.